Dec. 18, 1928.  
R. ARCHER  
1,695,704  
INTERNAL COMBUSTION ENGINE  
Filed April 23, 1926     5 Sheets-Sheet 1

Inventor.  
Raymond Archer.  
By Adam E. Fisher.  
Attorney

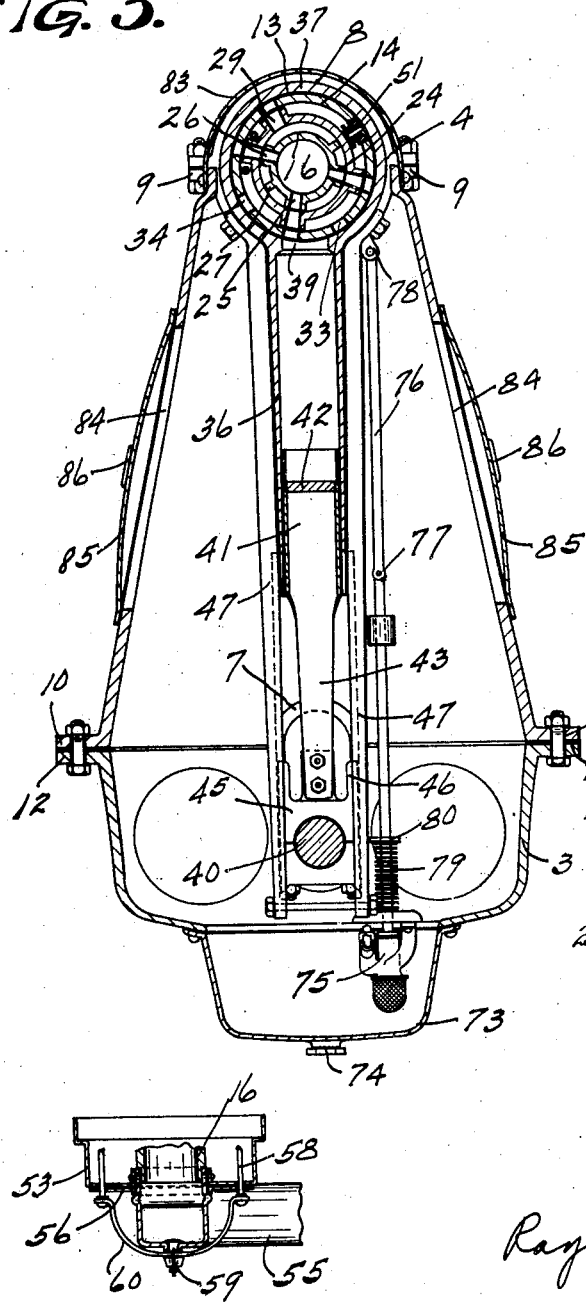
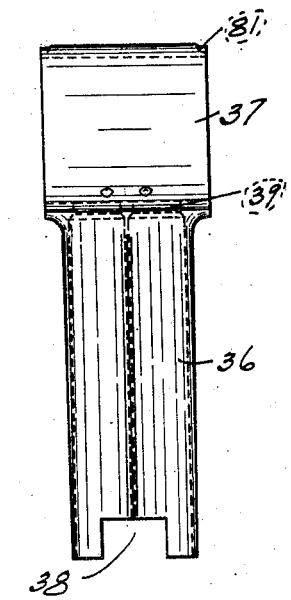
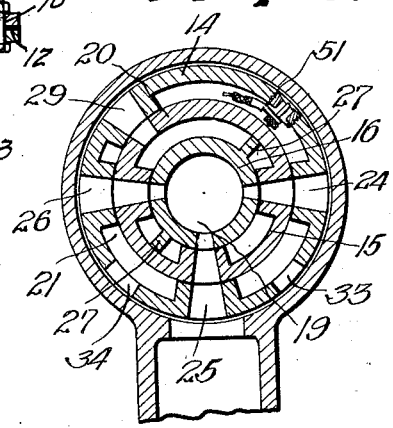

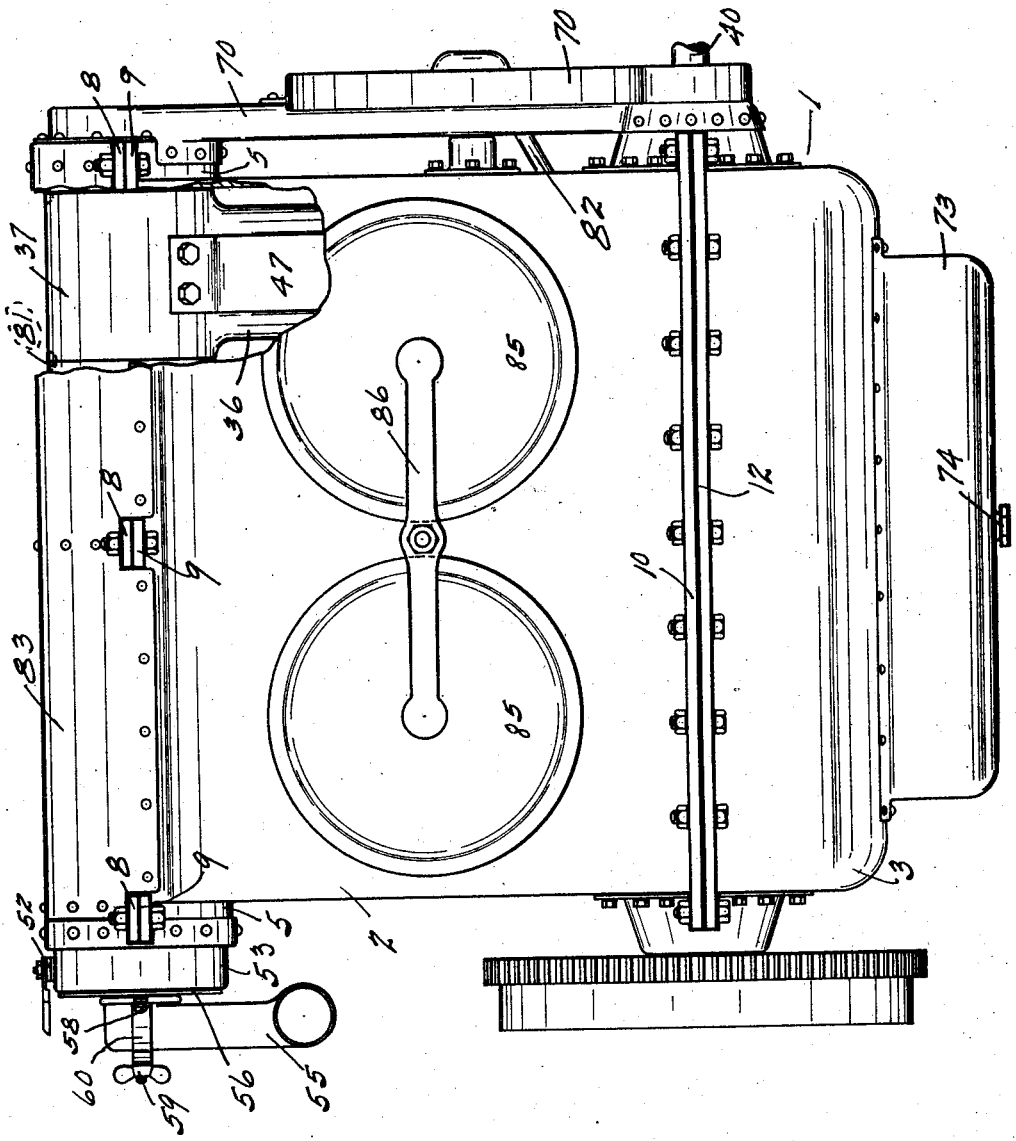

Dec. 18, 1928.  R. ARCHER  1,695,704

INTERNAL COMBUSTION ENGINE

Filed April 23, 1926   5 Sheets-Sheet 5

Patented Dec. 18, 1928.

1,695,704

UNITED STATES PATENT OFFICE.

RAYMOND ARCHER, OF REDMOND, OREGON.

INTERNAL-COMBUSTION ENGINE.

Application filed April 23, 1926. Serial No. 104,014.

This invention relates to internal combustion engines, especially that type known as a straight-eight.

The primary object of the invention is to provide a high powered, air cooled engine, having a relatively small bore and long stroke.

Another object is to provide a revolving valve comprising annular concentric air, intake and exhaust chambers.

Another object is to cast and pivotally mount the combustion cylinders in pairs upon the rotary valve.

A further object is to provide tubular pistons provided with threaded heads and mounting the pistons in pairs upon common crank shaft bearings.

A further object is to provide bearing guides which are rigidly secured to the cylinders to relieve the side strain of the piston rods in oscillating the cylinders in unison with the revolutions of the crank shaft.

A still further object is to provide a timing mechanism arranged in such a manner as to fire the eight cylinders in rotation.

Other objects and advantages of the engine will become apparent from the accompanying drawings and specifications.

In the drawings

Figure 3 is a transverse vertical section taken on the line "3—3" of Figure 1, showing the lubricating pump drive;

Figure 4 is a side elevation of the engine, partly in section, showing the method of mounting the cylinders and bearing guides;

Figure 6 is a detail of the exhaust pipe as mounted on the rotary valve;

Figure 7 is a detail of a set of cylinders;

Figure 13 is an enlarged transversely sectional view through the valve structure and its housing. other parts being removed.

Figure 1:
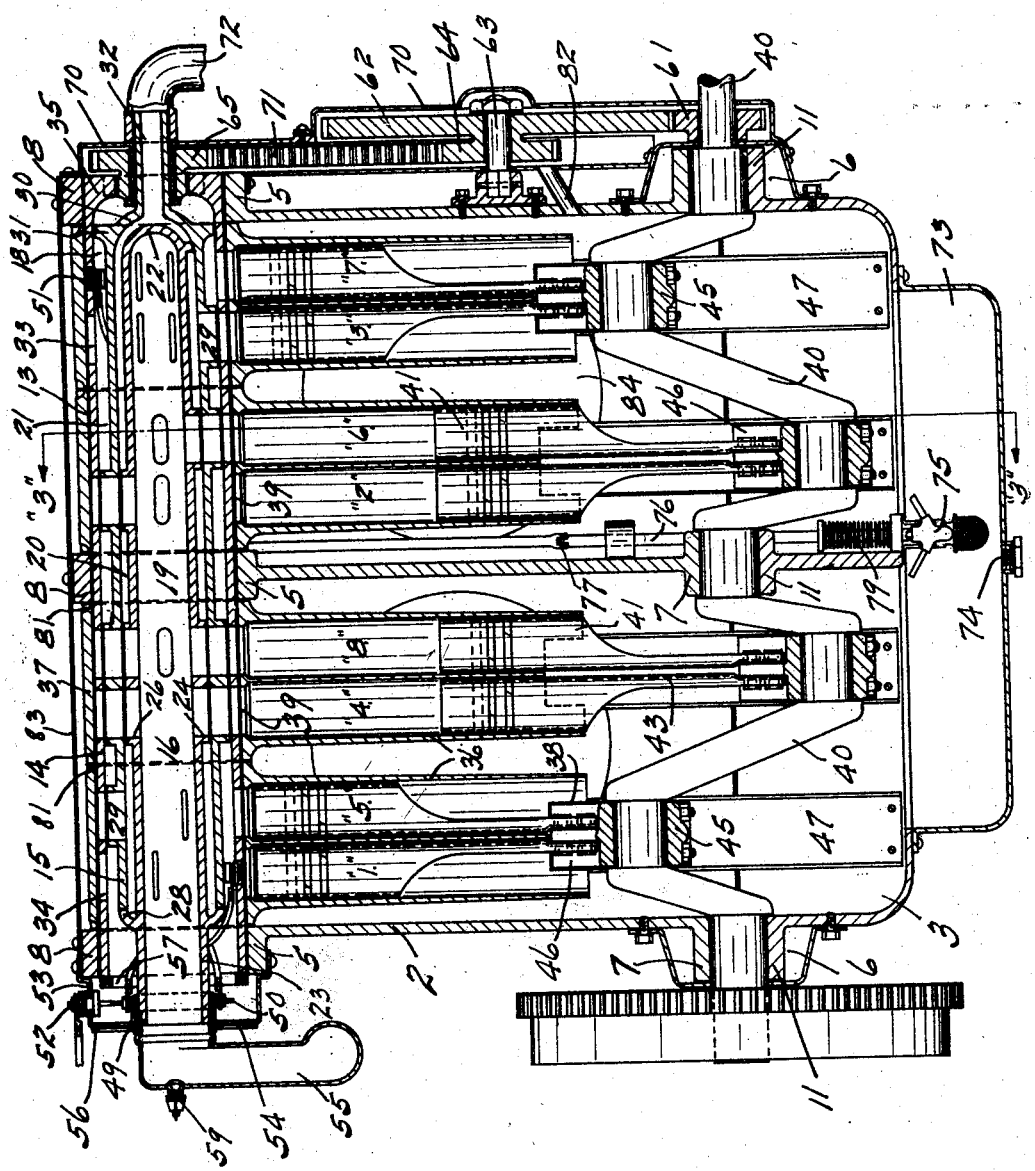
Figure 1 is a longitudinal vertical section of an engine as contemplated by my invention.
Figure 2:
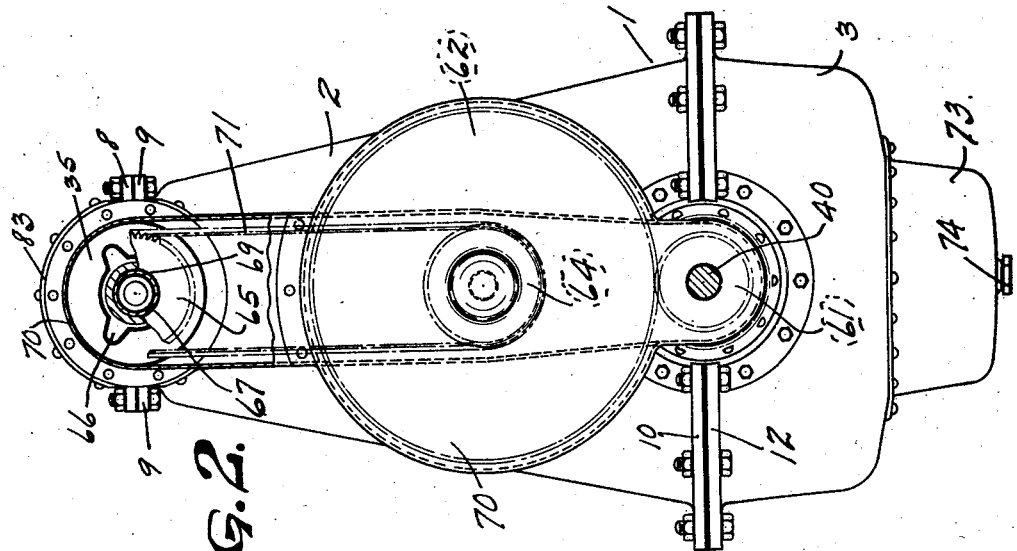
Figure 2 is a front elevation, partly in section, showing the driving arrangement of the rotary valve.
Figure 5:
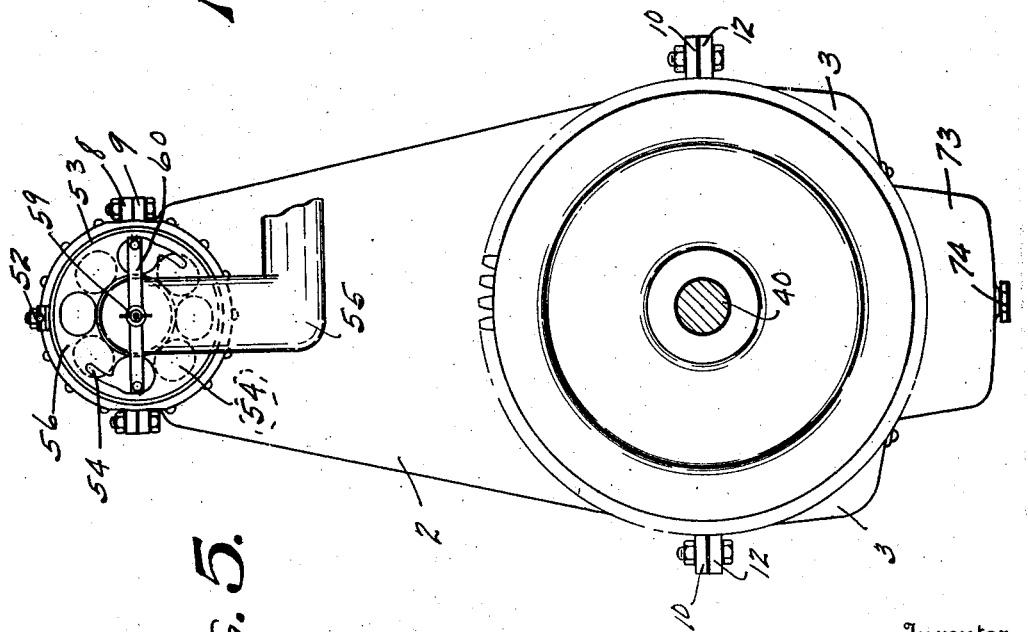
Figure 5 is a rear end elevation, showing the air draft for the air chamber of the rotary valve.

The invention comprises an engine housing 1 cast in upper and lower sections 2 and 3. The upper section 2 is cast with the lower half 5 of rotary valve bearings 4 and the upper half 7 of crank shaft bearings 6. Flanges 9 are formed at the top of the upper section 2 to permit securing the upper half 8 of the bearings 4 thereto. Outer flanges 10 are formed along the bottom edge of the said upper section 2 to facilitate making a leakproof joint, in bolting the lower section 3 to the said upper section 2. The lower section 3 has the lower half 11 of the crank shaft bearings 6 cast therein. Outer flanges 12 corresponding to the outer flanges 10 of the upper section are formed along the upper edge of the lower section to permit bolting the said lower section to the upper section. Journaled in the bearings 4 is a rotary valve 13 comprising a primary shell 14, secondary shell 15 adapted to be concentrically positioned within said primary shell 14 and tertiary shell 16 adapted to be concentrically positioned within said secondary shell 15, all telescoped together as shown at 18 and adapted to rotate together, thus dividing the rotary valve into several distinct concentric chambers as follows: the center or exhaust chamber 19, the middle or intake chamber 20, and the outer or cold air chamber 21. The tertiary shell 16 which comprises the exhaust chamber 19 is closed at its forward end 22 and slightly tapered from the rear end 23 to the forward end 22. The said tertiary shell 16 is provided with externally flanged exhaust ports 24, 25 and 26 for each of the cylinders of the engine. A division flange 27 and a secondary shell flange 28 are cast on the outer surface of the tertiary shell 16. The flanges of the exhaust ports 24, 25 and 26 and the division flange 27 are turned down so as to snugly fit into the secondary shell 15, permitting the flange 28 to fit snugly against the rear end of the said secondary shell 15 in order to close that end of the combustion chamber 20. Externally flanged exhaust ports corresponding to and being in perfect alignment with the exhaust ports 24, 25 and 26, and flanged intake ports 29, are cast in the secondary shell 15. The forward end of the secondary shell 15 is reduced as shown at 30 and formed with a primary shell flange 31 and an extended pipe nipple 32. The said shell 15 is correspondingly tapered to the taper of the tertiary shell 16 and has its flanged ports and primary shell flange turned down so as to snugly engage the inner periphery of the primary shell 14. The said primary shell 14 has the exhaust ports 24, 25 and 26, the intake ports 29 and air intake ports 33 and 34 provided therein and an internal flange 35 formed in its forward end. The said exhaust and intake ports are in perfect alignment with each other and the ports in the various shells. The said primary shell tapers toward the forward end, corresponding to the taper of the secondary and tertiary shells.

Cast or forged combustion cylinders 36 are pivotally strapped to the rotary valve 13 by means of straps 37 formed integrally with the said cylinders 36. The said straps 37 form the outer sleeve for the primary shell 14 and are bored with a tapering bore corresponding to the size and taper of the said primary shell. The said cylinders 36 which are designed for a small bore and long stroke are formed in pairs upon a common strap and taper on the outside from the breech to the mouth of the cylinders. At their mouth the cylinders 36 have a portion of the side walls and the dividing wall cut out as shown at 38, while their heads are provided with common intake and exhaust ports 39 which are in alignment with the various intake and exhaust ports of the timing shell 13. A crank shaft 40 is journaled in the crank shaft bearings 6. The said crank shaft is formed similar to the crank shafts used in four-cylinder engines. Tubular pistons 41 provided with threaded piston heads 42 are integrally formed with piston rods 43 which are releasably secured to piston rod bearings 45; there being two piston rods secured to each bearing. Each of the said bearings 45 are provided with shoes 46 which are adapted to engage slides 47 that are secured to the cylinder straps 37 for the purpose of relieving the side strains upon the piston rods in swinging the cylinders 36 from side to side in conformity to the rotation of the crank shaft. The said piston heads are screwed into the pistons so as to form a compression chamber 48 for relieving the cylinders of the strain created by the explosion of the compressed combustible material when ignited. A timing ring 49 made of porcelain or some other suitable non-conductive material is formed with a series of terminals 50. The said terminals 50 have insulated conductors secured thereto, which are passed thru the cold air chamber 21 and connected with their free ends to spark plugs 51 which are located in the primary shell 14. The spark plugs 51 are connected with the terminals 50 in the rotation in which they fire the cylinders. A timer terminal 52 is insulated against and secured to a sheet metal cap 53 Fig. 4 which covers the rear end of the rotary valve 13 and is secured to the rear bearing 4 of the said rotary valve 13. The said terminal 52 is connected in the usual manner to the magneto or battery (not shown). The cap 53 has a series of apertures 54 pierced therein to permit cold air being drawn into the cylinders. An exhaust pipe 55 is secured in the cap 53 and is adapted to engage the open end of the tertiary shell 18. A shutter 56 is mounted on the exhaust pipe 55 and engages cap 53 to permit closing the apertures 54 in cold weather until the engine has warmed up sufficiently to thoroughly vaporize the gasoline and run smoothly. A ball bearing race 57 is mounted on the primary shell 14 and has tension pins 58 which are journaled in the cap 53 secured thereto. A bolt 59 carrying a leaf spring 60 is secured in the exhaust pipe 55; the said leaf spring 60 being adapted to engage the tension pins 58 to provide means for keeping the said rotary valve in snug engagement with the cylinder straps 37 during the stages of expansion and contraction of the said rotary valve under the influence of heat and cold. The valve drive consists of a set of spur gears 61 and 62 geared at a ratio of "4 to 1". The gear 61 is secured to the crank shaft 40 while the gear 62 is loosely mounted upon a counter shaft 63 which is secured to the section 2 of the engine housing 1. A sprocket 64 is loosely mounted upon the counter shaft 63 and rigidly secured to the spur gear 62. A sprocket 65 identical to the sprocket 64 has a three teeth sprocket 66 secured thereto, and is provided with an enlarged bore 67 to permit mounting the same upon a sleeve 69 integrally formed in a section of gear housing 70. The said three teeth sprocket 66 has its teeth spaced approximately 120° around the circumference, that is a slight difference is made in the spacing of the teeth, so that the said teeth which are adapted to engage the flange 35 of the primary shell 14 cannot in any way be inserted in the wrong position in the said flange 35 and thereby confound the timing of the engine. A silent chain 71 is provided for driving the sprocket 65 off the sprocket 64. A gear housing 70 is provided for enclosing the timing gears and sprockets; the lower section of said housing is secured in any conventional manner to the housing 1 while the upper section is secured to the forward bearing 4 and the lower section of the said gear housing. An intake pipe 72 is connected at one end to the pipe nipple 32 of the secondary shell 15 in such a manner as to make a leak proof connection without interfering with the rotation of the rotary valve while the opposite end is connected in the usual manner to the carburetor (not shown). An oil pan 73 which is provided with a plug 74 is secured to the lower section 3 of the housing 1. An oil pump 75 is mounted on the lower section 3 and extends down into the oil pan 73. The pump 75 which is provided for lubricating the rotary valve bearings 4 and the crank shaft bearings 6 is operated by a hinged plunger rod 76 hinged at 77 and pivoted to an ear 78 which is incorporated in the cylinder strap 37 of the inner forward pair of cylinders 36. A coil spring 79 is mounted over the plunger rod 76 and a set collar 80 is secured to the said plunger rod 76 above the coil spring so as to keep the said coil spring under slight tension, to facilitate the action of the spring in creating the up stroke of the plunger rod. The over flow of oil of the center and rear rotary valve bearings 4 will assist in lubricating the cylinder straps 37, while the over flow of the front rotary valve bearing will be used for lubricating the valve drive. Oil pockets 81 Fig. 4 are provided in the straps 37 to catch any oil that may be splashed onto the straps from the oil pan as additional oiling means. An overflow pipe 82 is provided in the gear housing 70 to take care of any excess oil in the said gear housing. A metal cover 83 is secured to the timer bearings 4 to close in the top of the engine.

Hand holes 84 are cut in the sides of the upper section 2 of the housing 1 and cover plates 85 are secured over the hand holes 84 by means of clamps 86. The hand holes are provided to permit removing and replacing the pistons and piston rod bearings without disassembling the engine.

Figure 9:
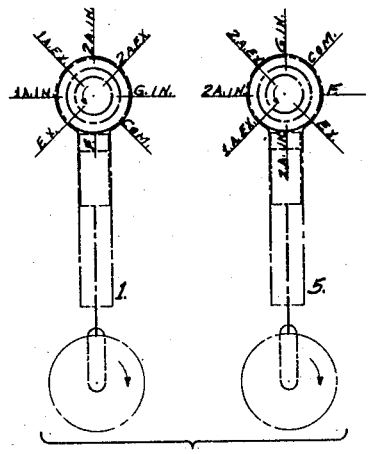
Figures 9, 10, 11 and 12 are diagrammatic details of the cylinders as paired together and timed in numerical rotation.
Figure 10:
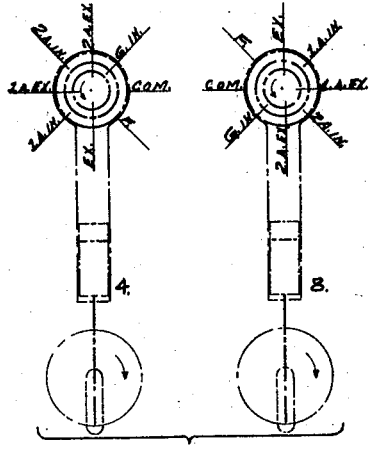
Figure 11:
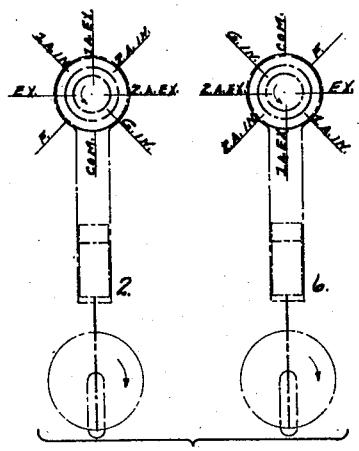
Figure 12:
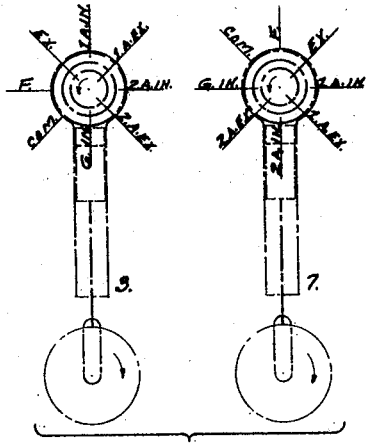
Figure 8:
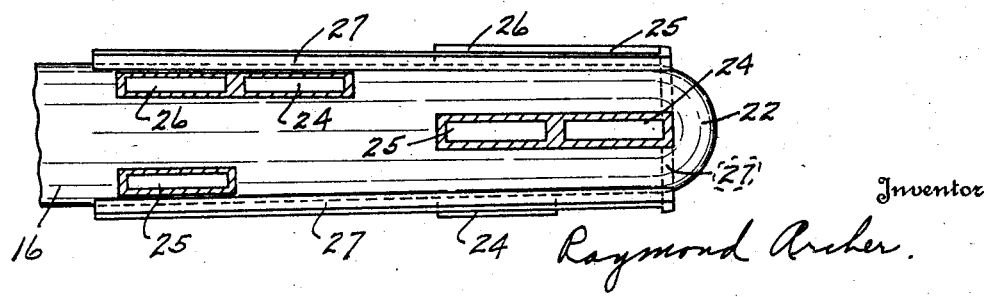
Figure 8 is a detail showing the division flange of the tertiary shell of the rotary valve.

The cylinders as paired and fulcrumed on the rotary valve from the rear end to the front end are as follows: "1 and 5"—"4 and 8" "2 and 6"—"3 and 7". In operation the crank shaft makes four complete revolutions or eight cycles to each power stroke of the piston, which operate as follows: first cycle, intake of combustible material on the down stroke of the piston, second cycle compressing on the up stroke of the piston, first revolution; third cycle ignition or power stroke on the down stroke of the piston, fourth cycle exhausting burnt gas on the up stroke of the piston, second revolution; fifth cycle first cool air intake on the down stroke of the piston, sixth cycle first exhaust of air on the up stroke of the piston, third revolution; seventh cycle second cool air intake on the down stroke of the piston, eighth cycle second exhaust of air on the up stroke of the piston, fourth revolution. As shown in the diagrammatic views in Figures 9, 10, 11 and 12 the relative position of the pistons at any time is as follows: When the piston of cylinder "No. 1" is in the position shown it is in position for the commencement of the power stroke; the piston in cylinder "No. 5" which is paired with cylinder "No. 1" is then in position for the "first fresh air intake stroke". The piston of cylinder "No. 4" is in position for "exhausting burnt gases", and the piston of cylinder "No. 8" which pairs with cylinder "No. 4" is in position for the "second air exhaust stroke". The piston of cylinder "No. 2" is in position for the "compression stroke", and the piston of cylinder "No. 6" which is paired with cylinder "No. 2" is in position for the "first air exhaust stroke". The piston of cylinder "No. 3" is in position for the "gas intake stroke", and the piston of cylinder "No. 7" which is paired with cylinder "No. 3" is in position for the "second air intake stroke". The terminal 52 is charged with electricity from the magneto or battery (not shown) so that when the terminals 50 which are connected with the spark plugs 51, engage the said terminal 52, the said spark plugs 51 will be charged with electricity for firing the charges of combustible material. The division flange 27 is arranged upon the outer surface of the tertiary shell 16 in such a manner as to force the combustible material entering the intake chamber 20 to travel along in the chamber until it reaches the center thereof before it can be drawn into the cylinders 2, 6, 3 and 7 thereby thoroughly vaporizing the gasoline. The gear ratio of four to one of the valve driving mechanism makes the arrangement of drawing cool air into the cylinders several times before drawing in gasoline possible, thereby cooling the cylinders and the exhaust chamber and removing the loose carbon before it is burnt into the cylinders by the next charge of combustible material. The cylinders 36 are provided with the cut out portion 38 to provide clearance for the connecting rod bearing shoes 46 which engages the bearing slides 47 in order to relieve the strain of the connecting rods when oscillating the cylinders.

The oil pump 75 is operated by the oscillation of the cylinder. When the crank shaft negotiates the arc of 90° from the upper vertical position to the horizontal position, the cylinder is swung toward the side, thereby drawing the plunger rod 76 up, with the assistance of the coil spring 79 and when the crank shaft negotiates the arc of 90° from the horizontal position to the lower vertical, the cylinder is swung into a vertical position causing the plunger rod to negotiate the compression stroke of the pump. The next quarter move of the crankshaft causes the plunger rod to continue the compression stroke, while the final quarter move of the crankshaft causes the plunger to commence the intake stroke. From the foregoing it will be seen that the plunger rod 76 makes one compression stroke with every revolution of the crank shaft.

While I have herein described a certain specific method of constructing and assembling the elements of my invention, it is understood same may be varied in minor details, not departing from the spirit of my invention as defined in the appended claims.

I claim:

1. In an internal combustion engine as described, the combination with the cylinders of said engines, a rotary valve provided with intake and exhaust ports arranged in such a manner as to charge the combustion cylinders of the engine with combustible material once in every four revolutions of the crank shaft, and means for communicating said valve with said cylinders, of a stationary terminal connected with a magneto or battery and mounted on said engine; an insulated terminal ring of insulation material mounted on said rotary valve; and spark plugs mounted on said rotary valve; said ring being connected with said spark plugs in said rotary valve and adapted for engagement with the stationary terminal for firing said combustible material in said cylinders.

2. In combination with an eight cycle engine and the cylinders thereof, a rotary valve adapted to operate said engine, said valve having an annular air inlet chamber, an annular fuel intake chamber concentrically within said air inlet chamber, and an exhaust chamber concentrically within said fuel intake chamber; said valve also having ports adapted to communicate said chambers successively with said cylinders; and means for operating the cylinders of said engine in pairs such that when one cylinder will be exhausting burnt gases into said exhaust chamber, the other cylinder will be exhausting air also into said exhaust chamber, whereby to cool the burnt gases and thereby reduce the back pressure on said cylinders.

3. In an internal combustion engine as described, the combination with the combustion cylinders thereof, of a tapered rotary valve comprising several telescoped shells forming exhaust, gas intake and air intake chamber, said shells being provided with intake and exhaust ports arranged in such a manner as to charge the combustion cylinders with combustible material once in every eight strokes thereof, and means provided in the said gas intake chamber for thoroughly vaporizing said combustible material.

4. In an internal combustion engine as described, the combination with the combustion cylinders thereof, of a housing, a tapered rotary valve journaled in said housing, said rotary valve comprising several tapered shells telescoped into each other and spaced from each other and rotatable together, the said shells comprising exhaust, gas intake and air intake chambers, gas and air intake and exhaust ports formed in said shells, and means for rotating said valve in the ratio of one revolution of the valve to four revolutions of the crankshaft of the engine.

In testimony whereof I affix my signature.

RAYMOND ARCHER.